United States Patent
Yamane

(10) Patent No.: US 8,244,996 B2
(45) Date of Patent: Aug. 14, 2012

(54) HIERARCHICAL STORAGE APPARATUS, CONTROL DEVICE, AND CONTROL METHOD

(75) Inventor: Daijirou Yamane, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 520 days.

(21) Appl. No.: 12/399,189

(22) Filed: Mar. 6, 2009

(65) Prior Publication Data

US 2009/0228655 A1    Sep. 10, 2009

(30) Foreign Application Priority Data

Mar. 6, 2008   (JP) .................. 2008-055654

(51) Int. Cl.
*G06F 12/00*   (2006.01)
(52) U.S. Cl. ............... 711/161; 711/156; 711/162
(58) Field of Classification Search ............ 711/161, 711/156
See application file for complete search history.

(56) References Cited

U.S. PATENT DOCUMENTS

| | | | |
|---|---|---|---|
| 5,537,585 A * | 7/1996 | Blickenstaff et al. .......... | 1/1 |
| 2005/0055512 A1 * | 3/2005 | Kishi ............... | 711/135 |
| 2006/0090049 A1 | 4/2006 | Saika | |
| 2006/0179087 A1 * | 8/2006 | Fujii et al. .......... | 707/205 |
| 2007/0271413 A1 * | 11/2007 | Fujibayashi et al. ...... | 711/112 |
| 2008/0104343 A1 * | 5/2008 | Miyagaki et al. .......... | 711/158 |
| 2008/0155215 A1 * | 6/2008 | Matsuzaki et al. .......... | 711/162 |
| 2008/0201542 A1 * | 8/2008 | Maruyama et al. .......... | 711/165 |

FOREIGN PATENT DOCUMENTS

| JP | 2004-157859 | 6/2004 |
|---|---|---|
| JP | 2006-215954 | 8/2006 |

\* cited by examiner

*Primary Examiner* — Hashem Farrokh
(74) *Attorney, Agent, or Firm* — Staas & Halsey LLP

(57) ABSTRACT

A storage apparatus includes a first storage device that primarily stores data, a second storage device, having a property differing from the first storage device, that secondarily stores the data, and a control device that controls a data migration between the first storage device and the second storage device. The control device includes a storage section that stores attribute information on the data stored in the first storage device, a priority determination section which, based on the attribute information, determines a priority for the data migration from the first storage device to the second storage device, and a data migration section which, based on the priority, causes the data to migrate from the first storage device to the second storage device.

15 Claims, 10 Drawing Sheets

FIG. 2

| CONTENT ID | CONTENT COMPILATION DATE | LATEST CONTENT UPDATE DATE | ... | CONTENT SIZE | NUMBER OF RETRIEVALS | RETENTION PERIOD | SHARED INFORMATION FILE CODE |
|---|---|---|---|---|---|---|---|
| 123456 | 2007:06:27:07:10:09 | 2007:06:27:07:10:09 | ... | 100KB | 1 | 5 MONTHS | AAAAAA |
| 123457 | 2007:06:27:07:10:10 | 2007:06:27:07:10:10 | ... | 10KB | 1 | 3 MONTHS | BBBBBB |
| 123458 | 2007:06:27:07:10:10 | 2007:09:15:10:10:10 | ... | 10KB | 2 | 3 MONTHS | BBBBBB |
| 123459 | 2007:06:27:07:10:12 | 2007:06:27:07:10:12 | ... | 1KB | 1 | 1 MONTH | CCCCCC |
| . | . | . | ... | . | . | . | . |
| . | . | . | ... | . | . | . | . |
| . | . | . | ... | . | . | . | . |

| CONTENT ID | CONTENT COMPILATION DATE | LATEST CONTENT UPDATE DATE | ...... | CONTENT SIZE | NUMBER OF RETRIEVALS | RETENTION PERIOD | SHARED INFORMATION FILE CODE |
|---|---|---|---|---|---|---|---|
| 123456 | 2007:06:27:07:10:09 | 2007:06:27:07:10:09 | ...... | 100KB | 1 | 5 MONTHS | AAAAAA |
| 123459 | 2007:06:27:07:10:12 | 2007:06:27:07:10:12 | ...... | 1KB | 1 | 1 MONTH | CCCCCC |
| 123458 | 2007:06:27:07:10:10 | 2007:09:15:10:10:10 | ...... | 10KB | 2 | 3 MONTHS | BBBBBB |
| 123457 | 2007:06:27:07:10:10 | 2007:06:27:07:10:10 | ...... | 10KB | 1 | 3 MONTHS | BBBBBB |
| . | . | . | | . | . | . | |
| . | . | . | | . | . | . | |
| . | . | . | | . | . | . | |

300

312
311
313
314

※ WITH RESPECT TO CONTENT WHOSE SIZE EXCEEDS OPTIONAL THRESHOLD VALUE (SET AT, FOR EXAMPLE, 80KB), FIRST FEW BYTES ARE SAVED ON DISK AT MIGRATION TIME.

FIG. 5A

| CONTENT ID | CONTENT COMPILATION DATE | LATEST CONTENT UPDATE DATE | ... | CONTENT SIZE | NUMBER OF RETRIEVALS | RETENTION PERIOD | SHARED INFORMATION FILE CODE |
|---|---|---|---|---|---|---|---|
| 123456 | 2007:06:27:07:10:09 | 2007:06:27:07:10:09 | ... | 100KB | 1 | 5 MONTHS | AAAAAA |
| 123457 | 2007:06:27:07:10:10 | 2007:06:27:07:10:10 | ... | 10KB | 1 | 12 MONTHS | BBBBBB |
| 123458 | 2007:06:27:07:10:10 | 2007:06:27:07:10:10 | ... | 10KB | 2 | 12 MONTHS | BBBBBB |
| 123459 | 2007:06:27:07:10:12 | 2007:09:15:10:10:10 | ... | 1KB | 1 | 12 MONTHS | CCCCCC |
| 123460 | 2007:06:27:07:10:12 | 2007:07:04:07:10:12 | ... | 2KB | 2 | 12 MONTHS | CCCCCC |
| 123461 | 2007:06:27:07:10:13 | 2007:08:22:07:10:13 | ... | 10KB | 3 | 8 MONTHS | DDDDDD |
| 123462 | 2007:06:27:07:10:14 | 2007:06:27:07:10:14 | ... | 30KB | 1 | 2 MONTHS | EEEEEE |
| 123463 | 2007:06:27:07:10:15 | 2007:09:26:15:10:15 | ... | 40KB | 2 | 3 MONTHS | FFFFFF |
| 123464 | 2007:06:27:07:10:16 | 2007:10:07:08:10:16 | ... | 50KB | 5 | 13 MONTHS | GGGGGG |
| 123465 | 2007:06:27:07:10:17 | 2007:08:15:09:12:17 | ... | 20KB | 2 | 3 MONTHS | HHHHHH |
| 123466 | 2007:06:27:07:10:18 | 2007:06:27:07:10:18 | ... | 3KB | 1 | 1 MONTH | JJJJJJ |
| 123467 | 2007:06:27:07:10:19 | 2007:06:27:07:10:19 | ... | 4KB | 1 | 3 MONTHS | KKKKKK |
| 123468 | 2007:06:27:07:10:20 | 2007:06:30:08:10:20 | ... | 10KB | 2 | 3 MONTHS | LLLLLL |
| 123469 | 2007:06:27:07:10:21 | 2007:06:27:07:10:21 | ... | 6KB | 1 | 5 MONTHS | MMMMMM |

SORT AND GROUP BY LATEST CONTENT UPDATE DATE, AND SET DATA TARGETED FOR MIGRATION

▓ SHADED DATA ARE TARGET DATA ON WHICH MIGRATION TO BE EXECUTED

502

| | CONTENT ID | CONTENT COMPILATION DATE | LATEST CONTENT UPDATE DATE | ...... | CONTENT SIZE | NUMBER OF RETRIEVALS | RETENTION PERIOD | SHARED INFORMATION FILE CODE |
|---|---|---|---|---|---|---|---|---|
| 56 | 123456 | 2007:06:27:07:10:09 | 2007:06:27:07:10:09 | ...... | 100KB | 1 | 5 MONTHS | AAAAAA |
| 57 | 123457 | 2007:06:27:07:10:10 | 2007:06:27:07:10:10 | ...... | 10KB | 1 | 12 MONTHS | BBBBBB |
| 59 | 123459 | 2007:06:27:07:10:12 | 2007:06:27:07:10:12 | ...... | 1KB | 1 | 12 MONTHS | CCCCCC |
| 62 | 123462 | 2007:06:27:07:10:14 | 2007:06:27:07:10:14 | ...... | 30KB | 1 | 2 MONTHS | EEEEEE |
| 66 | 123466 | 2007:06:27:07:10:18 | 2007:06:27:07:10:18 | ...... | 3KB | 1 | 1 MONTH | JJJJJJ |
| 67 | 123467 | 2007:06:27:07:10:19 | 2007:06:27:07:10:19 | ...... | 4KB | 1 | 3 MONTHS | KKKKKK |
| 69 | 123469 | 2007:06:27:07:10:21 | 2007:06:27:07:10:21 | ...... | 6KB | 1 | 5 MONTHS | MMMMMM |
| 68 | 123468 | 2007:06:27:07:10:20 | 2007:06:30:08:10:20 | ...... | 10KB | 2 | 3 MONTHS | LLLLLL |
| 65 | 123465 | 2007:06:27:07:10:17 | 2007:08:15:09:12:17 | ...... | 20KB | 2 | 3 MONTHS | HHHHHH |
| 61 | 123461 | 2007:06:27:07:10:13 | 2007:08:22:07:10:13 | ...... | 10KB | 3 | 8 MONTHS | DDDDDD |
| 63 | 123463 | 2007:06:27:07:10:15 | 2007:09:26:15:10:15 | ...... | 40KB | 2 | 3 MONTHS | FFFFFF |
| 64 | 123464 | 2007:06:27:07:10:16 | 2007:10:07:08:10:16 | ...... | 50KB | 5 | 13 MONTHS | CCCCCC |
| 58 | 123458 | 2007:06:27:07:10:10 | 2007:09:15:10:10:10 | ...... | 10KB | 2 | 12 MONTHS | BBBBBB |
| 60 | 123460 | 2007:06:27:07:10:12 | 2007:07:04:07:10:12 | ...... | 2KB | 2 | 12 MONTHS | CCCCCC |

FIG. 5D

IMPLEMENT MIGRATION IN ORDER IN UNITS OF RETENTION PERIOD ⇒

504

MIGRATION EXECUTION PRIORITY: HIGH → LOW
IN EVENT OF IDENTICAL CONDITIONS, IMPLEMENT MIGRATION FOR EACH RETENTION PERIOD

| | CONTENT ID | CONTENT COMPILATION DATE | LATEST CONTENT UPDATE DATE | ...... | CONTENT SIZE | NUMBER OF RETRIEVALS | RETENTION PERIOD | SHARED INFORMATION FILE CODE |
|---|---|---|---|---|---|---|---|---|
| 56 | 123456 | 2007:06:27:07:10:09 | 2007:06:27:07:10:09 | ...... | 100KB | 1 | 5 MONTHS | AAAAA |
| 69 | 123469 | 2007:06:27:07:10:21 | 2007:06:27:07:10:21 | ...... | 6KB | 1 | 5 MONTHS | MMMMM |
| 67 | 123467 | 2007:06:27:07:10:19 | 2007:06:27:07:10:19 | ...... | 4KB | 1 | 3 MONTHS | KKKKK |
| 68 | 123468 | 2007:06:27:07:10:20 | 2007:06:30:08:10:20 | ...... | 10KB | 2 | 3 MONTHS | LLLLL |
| 62 | 123462 | 2007:06:27:07:10:14 | 2007:06:27:07:10:14 | ...... | 30KB | 1 | 2 MONTHS | EEEEE |
| 66 | 123466 | 2007:06:27:07:10:18 | 2007:06:27:07:10:18 | ...... | 3KB | 1 | 2 MONTHS | JJJJJ |
| 57 | 123457 | 2007:06:27:07:10:10 | 2007:06:27:07:10:10 | ...... | 10KB | 1 | 1 MONTH | BBBBB |
| 59 | 123459 | 2007:06:27:07:10:12 | 2007:06:27:07:10:12 | ...... | 1KB | 1 | 12 MONTHS | CCCCC |
| 65 | 123465 | 2007:06:27:07:10:17 | 2007:08:15:09:12:17 | ...... | 20KB | 2 | 3 MONTHS | HHHHH |
| 61 | 123461 | 2007:06:27:07:10:13 | 2007:08:22:07:10:13 | ...... | 10KB | 3 | 8 MONTHS | DDDDD |
| 63 | 123463 | 2007:06:27:07:10:15 | 2007:09:26:07:10:15 | ...... | 40KB | 2 | 3 MONTHS | FFFFF |
| 64 | 123464 | 2007:06:27:07:10:16 | 2007:10:07:08:10:16 | ...... | 50KB | 5 | 13 MONTHS | CCCCC |
| 58 | 123458 | 2007:06:27:07:10:10 | 2007:09:15:10:10:10 | ...... | 10KB | 2 | 12 MONTHS | BBBBB |
| 60 | 123460 | 2007:06:27:07:10:12 | 2007:07:04:07:10:12 | ...... | 2KB | 2 | 12 MONTHS | CCCCC |

HIERARCHICAL STORAGE APPARATUS, CONTROL DEVICE, AND CONTROL METHOD

CROSS-REFERENCE TO RELATED APPLICATIONS

This application is related to and claims priority to Japanese patent application no. 2008-055654 filed on Mar. 6, 2008 in the Japan Patent Office, the entire contents of which are incorporated by reference herein.

FIELD

Various embodiments of the present invention discussed herein relate to a hierarchical storage apparatus.

BACKGROUND

In recent years, a hierarchical storage apparatus has been commercialized in which a disk device and a tape library device are combined, or a quickly accessible disk device and a slow disk device are combined.

FIG. 6 illustrates a configuration of a hierarchical storage apparatus. The hierarchical storage apparatus 601 has a function of automatically retaining the data in an optimum save place (a disk device 603 or a library device 604) by a control device 602, in accordance with a level of a freshness or reference frequency of data (content). The hierarchical storage apparatus 601 retains data that are high in reference frequency or comparatively new in the quickly accessible disk device 603, and migrates old data to the library device 604, which has data access that is slow. Then, the hierarchical storage apparatus 601 has a function of referring to the data by carrying out a retrieval thereof from the library device 604 to the disk device 603.

FIG. 7 illustrates an amount of data in the disk device. Content is deleted from the disk device 603 until it occupies several percent of a whole capacity of a disk (for example, a lower threshold limit or more, and an upper threshold limit or less), after being migrated onto the library device 603. Then, a use area on the disk is secured, realizing an increase in content retention efficiency.

In a content management in the hierarchical storage apparatus 601, there is a hierarchical storage apparatus having a function whereby a life span (a retention period) of content is optionally determined, and the content is retained without being deleted during the retention period. Also, there is also a hierarchical storage apparatus 601 that has a function capable of postponing an expiration of the retention period.

Also, in the content management in the hierarchical storage apparatus 601, for a plurality of items of content, shared information of data thereof is retained as a single item of data, and only information portions differing between the items of content are managed as individual items of content information. There is also a hierarchical storage apparatus that has a function of using a shared information portion and an individual information portion by retrieving them separately at a retrieval time (a single instance function).

A data storage apparatus which, when causing a file to migrate, saves a copy not only to a removable medium, but simultaneously to an inexpensive second cache is described in JP-A-2004-157859.

However, as a content migration method in the hierarchical storage apparatus is executed based only on information on the data's age, it is impossible to efficiently carry out a migration. Therefore, is a problem in that a disk area is depleted at an early stage.

Also, in a case of wanting to collectively change items of content having identical retention periods, it is necessary to retrieve content from a tape library onto a disk, but in the event that a migration of content is executed based only on an age of content data, there is also a possibility of saving the content to a differing tape medium. For this reason, it is necessary to make an access to a plurality of tape media. Therefore, has also been a problem of requiring time to retrieve content on the tape library.

Also, there is also a problem in that, since a time taken to retrieve large size content from the tape library is long, it is impossible to achieve a satisfying performance in response to a retrieval request.

SUMMARY

A hierarchical storage apparatus includes a first storage device that primarily stores data, a second storage device, having a property differing from the first storage device, that secondarily stores the data, and a control device that controls a data migration between the first storage device and the second storage device. The control device includes a storage section that stores attribute information on the data stored in the first storage device, a priority determination section which, based on the attribute information, determines a priority for the data migration from the first storage device to the second storage device, and a data migration section which, based on the priority, causes the data to migrate from the first storage device to the second storage device.

A control device that controls a data migration between a first storage device that primarily stores data and a second storage device that secondarily stores the data includes a storage section that stores attribute information on the data stored in the first storage device, a priority determination section that determines a priority for the data migration from the first storage device to the second storage device based on the attribute information, and a data migration section that causes the data to migrate from the first storage device to the second storage device, based on the determined priority.

A method of controlling a data migration between a first storage device that primarily stores data and a second storage device, having a property differing from the first storage device, that secondarily stores the data. The method includes storing attribute information on the data stored in the first storage device, determining a priority for the data migration from the first storage device to the second storage device based on the attribute information, and migrating the data from the first storage device to the second storage device based on the determined priority.

BRIEF DESCRIPTION OF THE DRAWINGS

FIG. 2 illustrates a data structure of the information database.

FIGS. 5A to 5D illustrate determination data and priority data according to an embodiment of the invention.

DESCRIPTION OF EMBODIMENT

Figure 1:
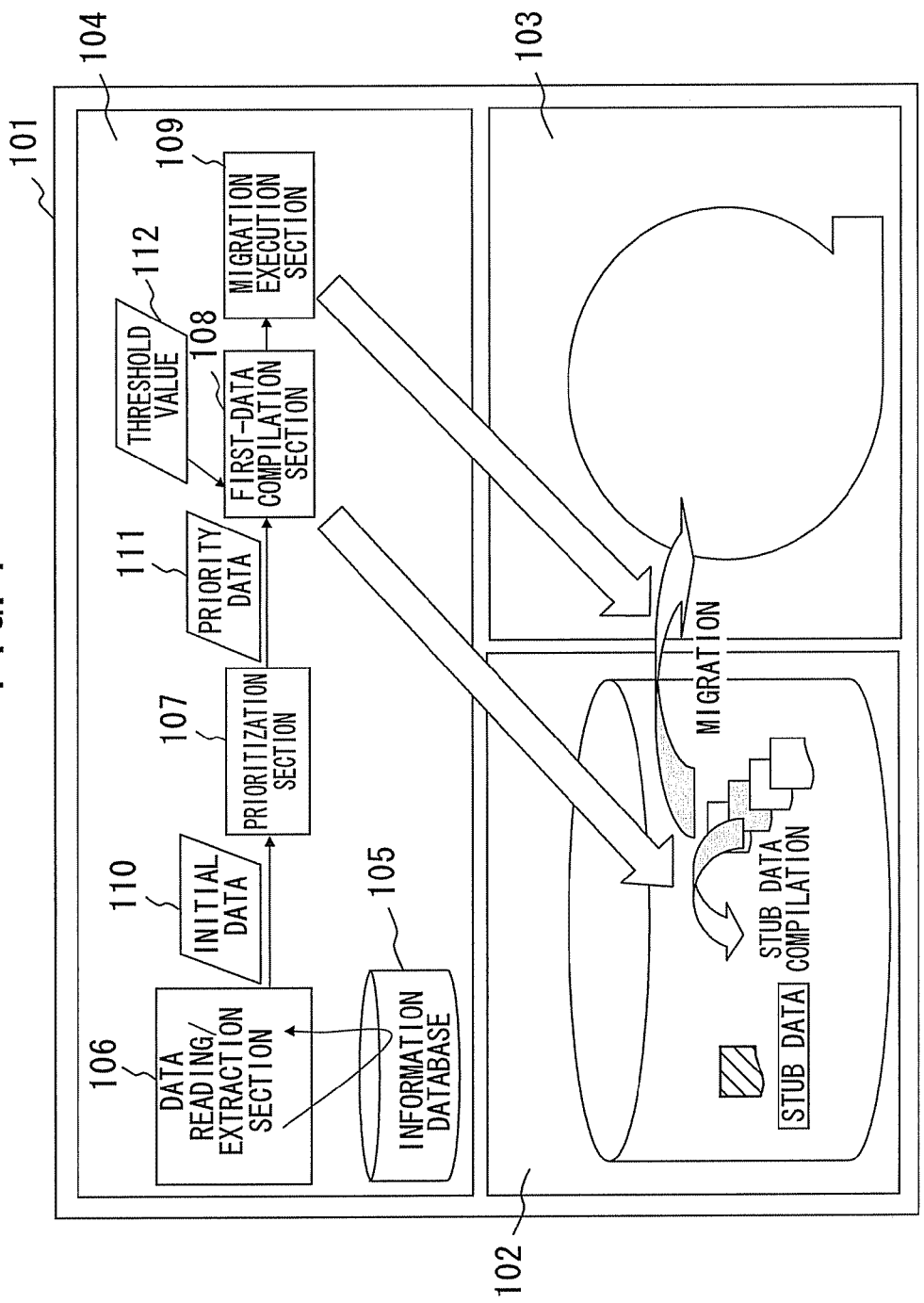
FIG. 1 illustrates a hierarchical storage apparatus according to an embodiment of the invention.

FIG. 1 illustrates a hierarchical storage apparatus according to an embodiment of the invention. A hierarchical storage apparatus 101 includes a disk device 102, a library device 103, and a control device 104.

The disk device 102 stores content (data). The hierarchical storage apparatus 101 first stores newly compiled content in the disk device 102. That is, the disk device 102 is a device for a primary storage. Also, the disk device 102 is a quickly readable/writable storage unit, for example, a magnetic disk or the like.

The library device 103 stores content migrated from the disk device 102. That is, the library device 103 is a device for a secondary storage. The library device 103 is an inexpensive storage unit that reads and writes data more slowly than the disk device 102. For example, a magnetic tape or the like is used as the library device 103. The device for the secondary storage is not limited to the library device, it is also acceptable that it is a slow disk device or the like.

The control device 104 includes an information database 105, a data reading/extraction section 106, a prioritization section 107, a first-data compilation section 108, and a migration execution section 109.

The information database 105, being stored in a storage device included in the control device 104, stores various kinds of information on the content on the disk device 102. Details of a configuration of the information database 105 will be described hereafter.

The data reading/extraction section 106 includes an SQL issuing section (not shown), and retrieves data from the information database 105 by means of an issue of an SQL (Structured Query Language), and transmits them as initial data 110 to the prioritization section 107.

The prioritization section 107 carries out a prioritization, which determines an order in which to carry out a data migration, on the initial data 110 according to a predetermined rule. Then, the prioritization section 107 transmits the data prioritized as priority data 111.

The first-data compilation section 108 reads a threshold value 112, and compiles a first few bytes of content, of content targeted for a data migration, whose size is the threshold value 112 or more, as stub content. The first-data compilation section 108 stores the stub data in the disk device 102.

The migration execution section 109 migrates the content targeted for the data migration from the disk device 102 to the library device 103, based on the priority data 111.

Also, the hierarchical storage apparatus 101 has a so-called single instance function that shares an item of content data itself (actual data) in the event that the actual data is the same as another item of content data. That is, in the event that a plurality of items of content have actual data with identical details, items of attribute information in which various kinds of content information (for example, a content compilation date, a content size, and the like) are described exist inside the information database 105, corresponding to the items of content, but only one item of data corresponding to the plurality of items of content exists in the disk device 102 and a use area on the disk device 102 is saved by sharing the data. Information indicating actual data of content is described in the attribute information. A data hash code is generally used as the information indicating the actual data of the content.

FIG. 2 illustrates an example of a data structure of the information database. The information database 105 of FIG. 2 shows an information database in a case in which n items of content exist in the disk device 102. Items of attribute information 211 to n are items of information relating to the n items of content stored in the disk device 102, that is, so-called metadata.

The information database 105 has, a content ID 201, a content compilation date 202, a latest content update date 203, a content size 204, a number of retrievals 205, a retention period 206, and a shared information file code 207 as items.

The content ID 201 indicates a content identification number, wherein differing numbers are allotted for each item of content. The content compilation date 202 indicates a date on which content was compiled. For example, a compilation date of content corresponding to the attribute information 211 is 2007:06:27:07:10:09, which indicates that the content was compiled at 10 minutes and 9 seconds past 7 a.m., on Jun. 27, 2007.

The latest content update date 203 indicates a time and date at which the content was last accessed. A data format is the same as that of the content compilation date 202.

The number of retrievals 205 indicates a number of times the content has been accessed. For example, a number of content retrievals corresponding to the attribute information 211 is one. Consequently, this indicates that the content corresponding to the attribute information 211 has been accessed once up to the present.

The retention period 206 indicates a period for which the content is retained without being deleted after it has been compiled. The shared information file code 207 is a code unique to actual data of the content. For example, a hash code of the data can be used. For example, in both items of attribute information 212 and 213, the shared information file code 207 is BBBBBB. This indicates that the two items of content share data whose shared information file code 207 is BBBBBB. Also, a shared information quantity is a quantity that indicates how many items of content sharing the actual data of the content exist, including the content itself too. For example, as the shared information file codes 207 of the items of attribute information 212 and 213 are both BBBBBB, the shared information quantity of content corresponding to each item of attribute information 212 and 213 is two.

Figure 3:
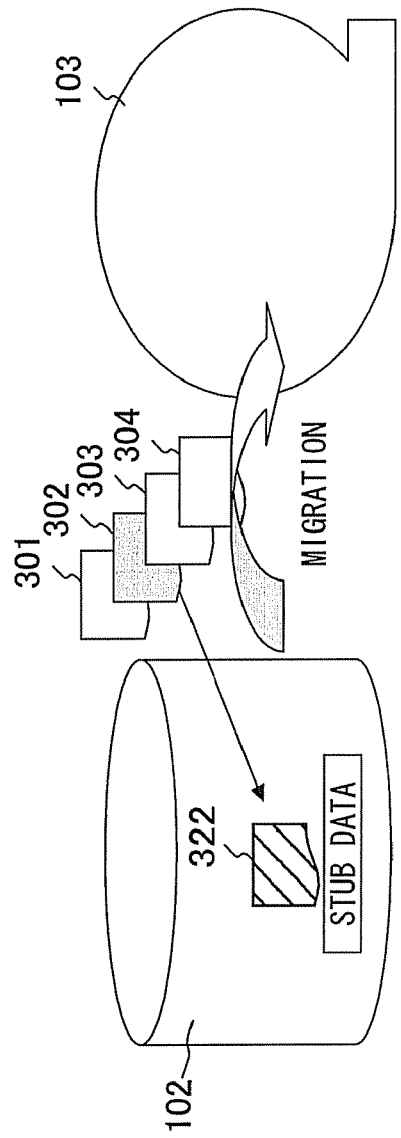
FIG. 3 illustrates stubbing.

Next, a description will be given of a so-called stubbing whereby first portion data of content are compiled in the disk device. FIG. 3 illustrates the stubbing.

In a case of retrieving data in the library device 103, the data is retrieved therefrom onto the disk device 102. In this case, in the event that the data are large, a time taken to retrieve the data from the library device 103 being long, it is impossible to achieve a satisfying performance in response to a data retrieval request. Therein, when causing data of a certain size or larger to migrate, a first few bytes of the data are copied onto the disk device 102, and saved thereon.

In FIG. 3, a description will be given of a case of causing items of content 301 to 304 to migrate. Items of attribute information corresponding to the items of content 301 to 304 are items of attribute information 311 to 314, respectively.

An arrangement is adopted such as to stub content of the predetermined size or larger, for example, 80 KB or more, at a migration time. To refer to the attribute information 312, a size of the corresponding content 302 is 100 KB. Consequently, when migrating the content 302 to the library device 103, a first few bytes of the content 302 are saved as stub data 322 to the disk device 102.

The stub data 322 on the disk device 102 are retrieved firstly, and returned to a request source, when a request to retrieve the content 302 is issued. As stub data, which are a first portion of content on the disk device 102, are firstly retrieved and returned in response also to a retrieval of large size content on the library device 103, it is possible to realize a high responsiveness to a retrieval request.

Figure 4:
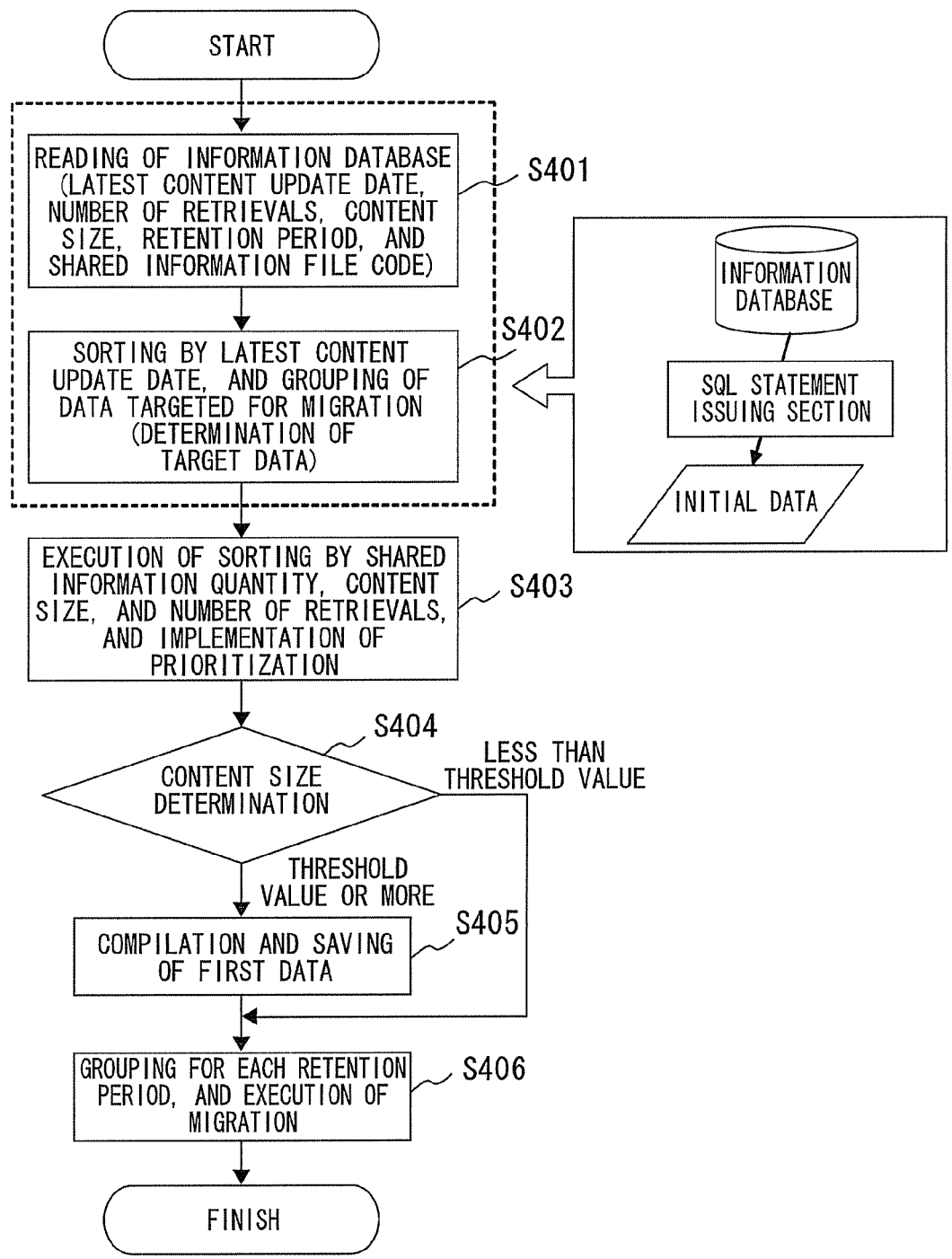
FIG. 4 illustrates a flow of a prioritization process of the hierarchical storage apparatus.

FIG. 4 illustrates a flowchart showing a flow of a prioritization process of the hierarchical storage apparatus according to the embodiment. The hierarchical storage apparatus 101 starts a prioritization when a predetermined time comes. Alternatively, the hierarchical storage apparatus 101 checks free space on the disk device 102 and, when the free space is reduced to a predetermined value, starts the prioritization.

In step S401, the SQL issuing section issues the SQL (Structured Query Language) to the information database 105, extracts data, and transmits the extracted data as the initial data 110 to the prioritization section 107.

In step S402, the prioritization section 107 sorts the data in chronological order of latest content update date. Then, data of which a latest content update date is before a predetermined time and date are targeted for a migration. Content targeted for a migration is called migration target data. Hereafter, a prioritization will be carried out on the migration target data.

In step S403, the prioritization section 107, referring to the shared information file codes, checks whether each item of content has the same shared file code as another item of content, that is, whether they have data shared with each other (shared data), and sorts the items of content in increasing order of shared information quantity. It is also acceptable to sort the items of content according to the content size or number of retrievals, apart from in increasing order of shared information quantity.

In step S404, the prioritization section 107 determines whether a size of content is equal to or more than the threshold value by referring to the content size of the attribute information. If the size of the content is equal to or more than the threshold value, the prioritization section 107 moves to step S405 while, if the size of the content is less than the threshold value, the prioritization section 107 moves to step S406.

In step S405, a first few bytes of the content are compiled as stub data, and the stub data are saved.

In step S406, items of content are grouped for each retention period by referring to the retention period of the attribute information, and a migration is executed. The migration is executed when the predetermined time comes, and is executed at predetermined time intervals for each group. Also, it is acceptable to check free space on the disk device 102 and, when the free space is reduced to the predetermined value, execute the migration.

Figure 5C:
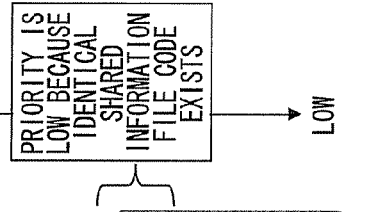
Figure 6:
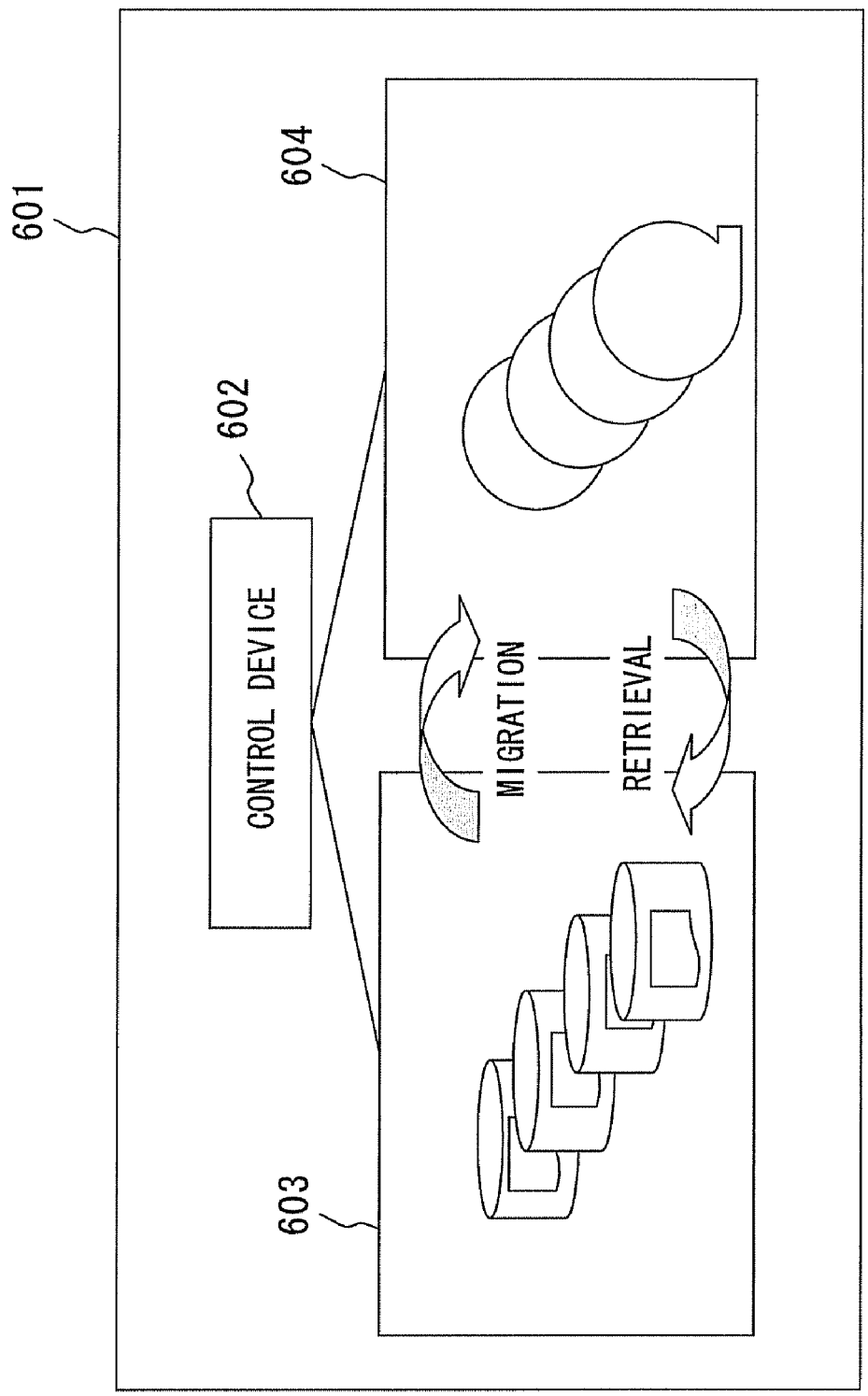
FIG. 6 illustrates a configuration of a hierarchical storage apparatus.
Figure 7:
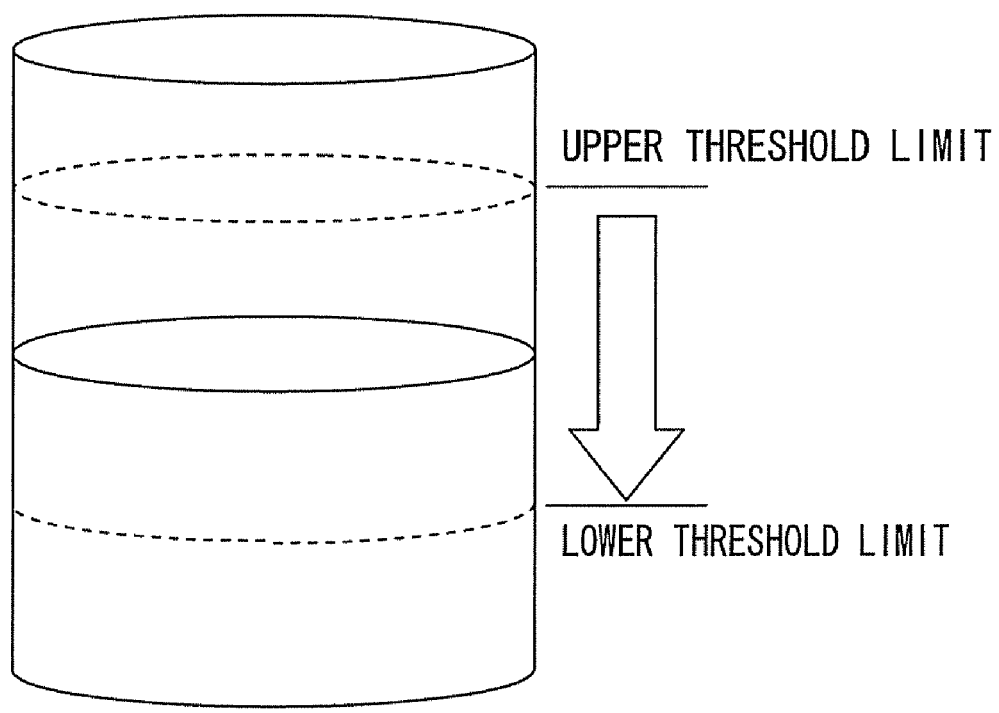
FIG. 7 illustrates an amount of data in a disk device.

Next, a description will be given of a change in the priority data 111 when carrying out a prioritization. FIGS. 5A to 5D illustrate the initial data and priority data according to the embodiment. Priority data 501 are the initial data 110 before being prioritized to be input into the prioritization section 107 (FIG. 5A).

14 items of content 556 to 569 (not shown) are stored in the disk device, and 14 items of attribute information corresponding to the items of content 556 to 569 are stored in the priority data 501. In the priority data 501 to 504 of FIGS. 5A to 5D represents that content corresponding to attribute information stored in an upper portion has a higher migration priority, and content corresponding to attribute information stored in a lower portion has a lower migration priority.

First, items of attribute information 56 to 69 are sorted in order of latest update date (step S402). By so doing, the priority data 501 are sorted as shown in FIG. 5B.

Then, data whose latest update date is on or before the predetermined time and data, in the embodiment, on or before Jul. 1, 2007, are targeted for a migration. Thus, data corresponding to the items of attribute information 56, 57, 59, 62, 66, 67, 69 and 68 are targeted for a migration.

It is possible for a user to optionally set a time and date on or before which data are to be targeted for a migration. Then, migration target data are sorted by the shared information quantity by referring to the shared information file codes of all items of the attribute information, and further sorted by the number of retrievals (step S403). Specifically, in the information database 502, as the shared information file code of the attribute information 57 is BBBBBB, and the shared information file code of the attribute information 58 is also BBBBBB, the shared information quantity of the attribute information 57 is two. Also, as the shared information file code of the attribute information 59 is CCCCCC, and the shared information file codes of the attribute information 64 and attribute information 69 are also CCCCCC, the shared information quantity of the attribute information 59 is three. Also, as the items of attribute information 56, 62, 66, 67, 69 and 68 have no other items of attribute information with the same shared information file codes as theirs, their shared information quantity is one. Then, the items of attribute information are sorted in such a way as to lower a priority of attribute information having a large shared information quantity. Furthermore, in the event that the shared information quantities are the same, a priority of attribute information having a large number of retrievals is lowered. By the items of attribute information being sorted based on the shared information quantity, and furthermore, on the number of retrievals, data having a large shared information quantity, and data having a large number of retrievals, are disposed in a lower portion inside the migration target data. By this means, the information database 502 are sorted as shown in FIG. 5c.

Next, items of attribute information are grouped for each retention period (step S406). In the information database 503, the items of attribute information 56 and 69 are placed together in one group as retention periods of the items of attribute information 56 and 69 are both five months. In the same way, the items of attribute information 67 and 68, retention periods of which are three months, are placed together in one group.

Then, a migration is executed for each group, starting from a highest priority item of content. That is, first, items of content corresponding to the attribute information 56 and 69 are migrated from the disk device to the library device and, after a predetermined time, items of content corresponding to the attribute information 67 and 68 are migrated from the disk device to the library device. Hereafter, in the same way, a migration is carried out in order, starting from an item of content corresponding to a topmost item of attribute information in the prioritization data 504 (FIG. 5D). In the way heretofore described, a migration is carried out for each item of content having the same retention period, or for each predetermined quantity of content.

Also, as a priority determination method, it is also acceptable to prepare a plurality of determination patterns, such as an order of number of retrievals or an order of content size, in advance, and predetermine a priority by combining them.

According to the hierarchical storage apparatus according to the embodiment, it is possible to keep data likely to be retrieved remaining on a disk, by prioritizing data based on a quantity of items of content that are shared with the data, among items of content having shared information. Therefore, it is possible to secure a high responsiveness to a data retrieval.

Also, by carrying out a migration by setting priorities based on the content size or number of retrievals, it being possible to secure sufficient free space in a primary save area (mainly the disk device), and it is possible to save more content.

Also, as items of content having close retention periods are saved in close positions on the library device by carrying out a grouping by the retention period, and a migration in units of group, in a case of carrying out a collective change of retention periods, a retrieval is made from a close medium on the library device, meaning that it is possible to further shorten a retrieval time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A storage apparatus, comprising:
    a first storage device that primarily stores data;
    a second storage device, having a property differing from the first storage device, that secondarily stores the data; and
    a control device that controls a data migration between the first storage device and the second storage device, wherein
    the control device includes:
    a storage section that stores attribute information for each item of content of the data stored in the first storage device, the attribute information including an attribute that indicates whether the respective item of content shares data with one or more other items of content;
    a priority determination section that sets a priority for the data migration from the first storage device to the second storage device based on the attribute information; and
    a data migration section that causes data to migrate from the first storage device to the second storage device based on the priority, wherein
    the priority determination section sets a migration priority for data such that an item of content that shares data with one or more other items of content has a lower priority than an item of content that does not share data with one or more other items of content.

2. The storage apparatus according to claim 1, wherein the priority determination section sets the priority based on a plurality of items of attribute information.

3. The storage apparatus according to claim 1, wherein the data migration section migrates the data to the second storage device, as well as retaining a portion of the data in the first storage device, in the event that a size of migration target data exceeds a predetermined size.

4. The storage apparatus according to claim 1, wherein the data migration section carries out a data migration process based on the priority at a predetermined time.

5. The storage apparatus according to claim 1, further comprising a usage verification section that verifies a usage of the first storage device, wherein
    the data migration section carries out the data migration process based on the priority when a free space on the first storage device is reduced to a certain value.

6. A control device that controls a data migration between a first storage device that primarily stores data and a second storage device that secondarily stores the data, the control device comprising:
    a storage section that stores attribute information for each item of content of the data stored in the first storage device, the attribute information including an attribute that indicates whether the respective item of content shares data with one or more other items of content;
    a priority determination section that sets a priority for the data migration from the first storage device to the second storage device based on the attribute information; and
    a data migration section that causes the data to migrate from the first storage device to the second storage device, based on the determined priority, wherein
    the priority determination section sets a migration priority for data such that an item of content that shares data with one or more other items of content has a lower priority than an item of content that does not share data with one or more other items of content.

7. The control device according to claim 6, wherein the priority determination section sets the priority based on a plurality of items of attribute information.

8. The control device according to claim 6, wherein the data migration section migrates the data to the second storage device, as well as retaining a portion of the data in the first storage device, in the event that a size of migration target data exceeds a certain size.

9. The control device according to claim 6, wherein the data migration section carries out a data migration process based on the priority at a predetermined time.

10. The control device according to claim 6, further comprising a usage verification section that verifies a usage of the first storage device, wherein
    the data migration section carries out the data migration process based on the priority when a free space on the first storage device is reduced to a certain value.

11. A method of controlling a data migration between a first storage device that primarily stores data and a second storage device, having a property differing from the first storage device, that secondarily stores the data, the method comprising:
    storing attribute information for each item of content of the data stored in the first storage device, the attribute information including an attribute that indicates whether the respective item of content shares data with one or more other items of content;
    setting a priority for the data migration from the first storage device to the second storage device based on the attribute information; and
    migrating the data from the first storage device to the second storage device based on the determined priority, wherein
    a migration priority for data is determined such that an item of content that shares data with one or more other items of content has a lower priority than an item of content that does not share data with one or more other items of content.

12. The method according to claim 11, wherein the priority for the data migration is set based on a plurality of items of attribute information.

13. The method according to claim 11, wherein the data is migrated to the second storage device, while a portion of the data is retained in the first storage device, in the event that a size of migration target data exceeds a certain size.

14. The method according to claim 11, wherein the data migration process is carried out based on the priority at a predetermined time.

15. The method according to claim 11, further comprising: verifying a usage of the first storage device, wherein the data migration process is carried out based on the priority when a free space on the first storage device is reduced to a certain value.

* * * * *